US007878089B2

(12) United States Patent
McLaughlin et al.

(10) Patent No.: US 7,878,089 B2
(45) Date of Patent: Feb. 1, 2011

(54) BICYCLE SHIFTER

(75) Inventors: Scott McLaughlin, Schweinfurt (DE);
Martin Weiss, Schweinfurt (DE);
Robert Bohm, Mainberg (DE)

(73) Assignee: SRAM Deutschland GmbH,
Schweinfurt (DE)

(*) Notice: Subject to any disclaimer, the term of this patent is extended or adjusted under 35 U.S.C. 154(b) by 1036 days.

(21) Appl. No.: 10/906,830

(22) Filed: Mar. 8, 2005

(65) Prior Publication Data
US 2005/0204854 A1 Sep. 22, 2005

(30) Foreign Application Priority Data
Mar. 19, 2004 (DE) .................. 10 2004 014 035

(51) Int. Cl.
*F16C 1/10* (2006.01)
*G05G 11/00* (2006.01)
*G05G 13/00* (2006.01)

(52) U.S. Cl. ................ 74/502.2; 74/488; 74/489
(58) Field of Classification Search ............. 74/502.2, 74/488, 489, 473.14; B62M 25/04
See application file for complete search history.

(56) References Cited

U.S. PATENT DOCUMENTS

| 4,319,673 | A | * | 3/1982 | Kojima ................ 192/217 |
| 4,532,825 | A | | 8/1985 | Nagano |
| 5,012,692 | A | * | 5/1991 | Nagano ............. 74/473.14 |
| 5,052,241 | A | | 10/1991 | Nagano |
| 5,632,226 | A | | 5/1997 | Huang |
| 5,701,786 | A | * | 12/1997 | Kawakami ............ 74/502.2 |
| 6,095,010 | A | | 8/2000 | Arbeiter |
| 6,502,477 | B1 | | 1/2003 | Assel |
| 7,000,496 | B2 | * | 2/2006 | Wessel et al. ......... 74/502.2 |
| 2003/0221507 | A1 | | 12/2003 | Wessel |
| 2006/0053940 | A1 | * | 3/2006 | McLaughlin et al. .... 74/502.2 |

FOREIGN PATENT DOCUMENTS

| EP | 0 589 392 A1 | 3/1994 |
| EP | 0 609 549 A1 | 8/1994 |
| EP | 0 669 250 A | 8/1995 |
| EP | 0 698 548 A1 | 2/1996 |
| EP | 1 270 396 A2 | 1/2003 |
| EP | 1 577 209 A2 * | 9/2005 |
| JP | 8-318888 * | 12/1996 |

OTHER PUBLICATIONS

Merriam Webster's Collegiate Dictionary, 10th Ed., 1999, pp. 328 and 889.*

* cited by examiner

*Primary Examiner*—Vinh T. Luong
(74) *Attorney, Agent, or Firm*—Milan Milosevic; Lisa Serdynski

(57) ABSTRACT

A trigger shifter for operating a bicycle gear change device that includes a housing mountable to handlebar, a cable spool for pulling and releasing a control cable connected to the gear change device, a pull lever mechanism and a release lever mechanism. The pull lever mechanism includes a pull lever rotatable about a first axis defining a first plane of motion perpendicular to the first axis. The release lever mechanism includes a release lever rotatable about a second axis defining a second plane of motion perpendicular to the second axis. The first and second planes of motion form an angle therebetween in the range of 20 to 70 degrees.

14 Claims, 6 Drawing Sheets

BICYCLE SHIFTER

BACKGROUND OF THE INVENTION

The present invention relates to bicycle shifters, and more particularly, to a trigger shifter having a pull lever movable through a first plane of motion and a release lever movable through a second plane of motion, wherein the first and second planes of motion form an angle therebetween in the range of 20 to 70 degrees.

A typical bicycle trigger shifter includes pull and release levers driving pawls engageable with a toothed disk rotatably joined to a cable spool, the shifter pulling and releasing a control cable connected to a gear change device. When the pull lever is actuated, the cable spool is rotated in the cable-pull direction. When the release lever is actuated, the cable spool rotates in the cable-release direction. The pull and release levers are biased to return to their rest positions after each actuation. The shifter may further include a detent mechanism for holding the cable spool in a selected gear position.

The patent EP 1 270 396 A2 discloses a trigger shifter having pull and release levers. The shifter is mounted to a lever bracket that supports a brake lever. Alternatively, the shifter may be a separate unit from the brake lever. The pull and release levers are disposed below the brake lever device. The levers pivot, like a cable spool, about a common axis extending perpendicular to the handlebar. The pull lever is actuated by a thumb moving in a forward riding direction, and the release lever is actuated by an index finger moving rearward, opposite the riding direction. A uniquely shaped pointer reflects the current gear position to an indicator located above the handlebar. The shifter housing is located below the handlebar and extends forward in the riding direction. The pull and release levers are also disposed below the handlebar. The release lever is disposed in front of the handlebar and the pull lever is disposed directly below the handlebar.

A disadvantage of this shifter is that the release lever is disposed between the handlebar and the brake lever, such that the release lever gets in the way when the index finger is wrapped around the handlebar, being unreachable by the index finger during actuation of the brake lever. This configuration prevents simultaneous braking and shifting in the release direction. Accordingly, there is a need to provide a trigger shifter that allows simultaneous braking and shifting in the release direction.

SUMMARY OF THE INVENTION

The present invention provides a trigger shifter for operating a bicycle gear change device that allows simultaneous braking and shifting in the release direction by having pull and release levers configured to be actuated a thumb. The trigger shifter includes a housing mountable to a handlebar, a cable spool for pulling and releasing a control cable, a pull lever mechanism and a release lever mechanism. The pull lever mechanism rotates the cable spool in a cable-pull direction and the release lever mechanism rotates the cable spool in a cable-release direction. The pull lever mechanism includes the pull lever which is rotatable about a first axis, defining a first plane of motion perpendicular to the first axis. The release lever mechanism includes the release lever which is rotatable about a second axis defining a second plane of motion perpendicular to the second axis. The first and second planes of motion form an angle therebetween in the range of 20 to 70 degrees. In a preferred embodiment, the first and second planes of motion form an angle of approximately 60 degrees.

The pull and release levers are arranged below the handlebar and include contact surfaces configured to be operated by the thumb. The contact surface of the pull lever is shaped and sized differently than the contact surface of the release lever. The contact surface of the pull lever faces in a rearward direction, opposite the forward riding direction, and is disposed behind the release lever. The contact surface of the release lever is partially inclined to allow the thumb to slip along the inclined contact surface when the rider moves his thumb in the riding direction. Further, the contact surfaces on the levers are oriented such that when the rider's fingers are wrapped around the handlebar, the thumb readily reaches the contact surfaces.

The pull lever is sufficiently long, providing enough mechanical advantage, to permit shifting with slight thumb pressure in the riding direction. The pull lever has a pivot arm that is longer than a pivot arm of the release lever. The pivot range of the pull lever allows multiple gear changes or shifts with one thumb movement. When the pull lever is released, it returns, under spring force, to its rest position. To release the control cable, light thumb pressure is applied to the release lever, moving the release lever in the forward, or riding direction, and the vertical direction. Since the required force for a release operation is less than that required force for a pull operation, the release lever is configured to be shorter than the pull lever. The shifting motion of the release lever is a pivoting motion. The second axis of the release lever is disposed adjacent to an axis of the cable spool and points partially in the riding direction and partially downward. The second axis of the release lever and the cable spool axis form an angle therebetween more than 90 degrees, and preferably, 120 degrees.

The release lever mechanism further includes a locking element including first and second locking pawls engageable with a plurality of teeth on the cable spool to maintain the cable spool in a selected gear position. Upon actuation of the release lever, the release lever pivots about the second axis and displaces the locking element. The release lever includes a drive surface that engages a corresponding surface on the locking element, to convert the pivoting motion of the release lever into linear motion of the locking element. At least one of the surfaces on the release lever and the locking element has a convex contour to reduce friction between the parts. When the locking element is displaced from its rest position, the first locking pawl is released from the cable spool, resulting in the cable spool rotating until engaged by the second locking pawl. When the release lever is released, the lever is biased by a spring to return to its rest position, causing the locking element to also return to its rest position. The second locking pawl releases the cable spool, allowing a further rotation of the cable spool until the first locking pawl once again engages the cable spool teeth. In contrast to the pull lever, only one gear change may be performed during actuation of the release lever.

In another embodiment, the housing includes an upper shell, a lower shell and a clamp. The lower shell encloses the pull and release mechanisms, and the cable spool. The clamp secures the shifter to the handlebar. The clamp and the upper shell may form one-piece. The clamp includes a gear display. The gear display includes an indicator window and a flat indicator strip movable by the cable spool to indicate the selected gear position through the indicator window. Preferably, the axial and radial clamp dimensions are kept as small as possible so as to prevent interfere with the placement and function of a brake lever. In yet another embodiment, the upper shell of the housing and the brake lever housing may form one piece, thereby eliminating a clamp, and the gear indicator is integrated in the remaining clamp.

These and other features and advantages of the present invention will be more fully understood from the following description of one or more embodiments of the invention, taken together with the accompanying drawings.

DETAILED DESCRIPTION

Figure 1:
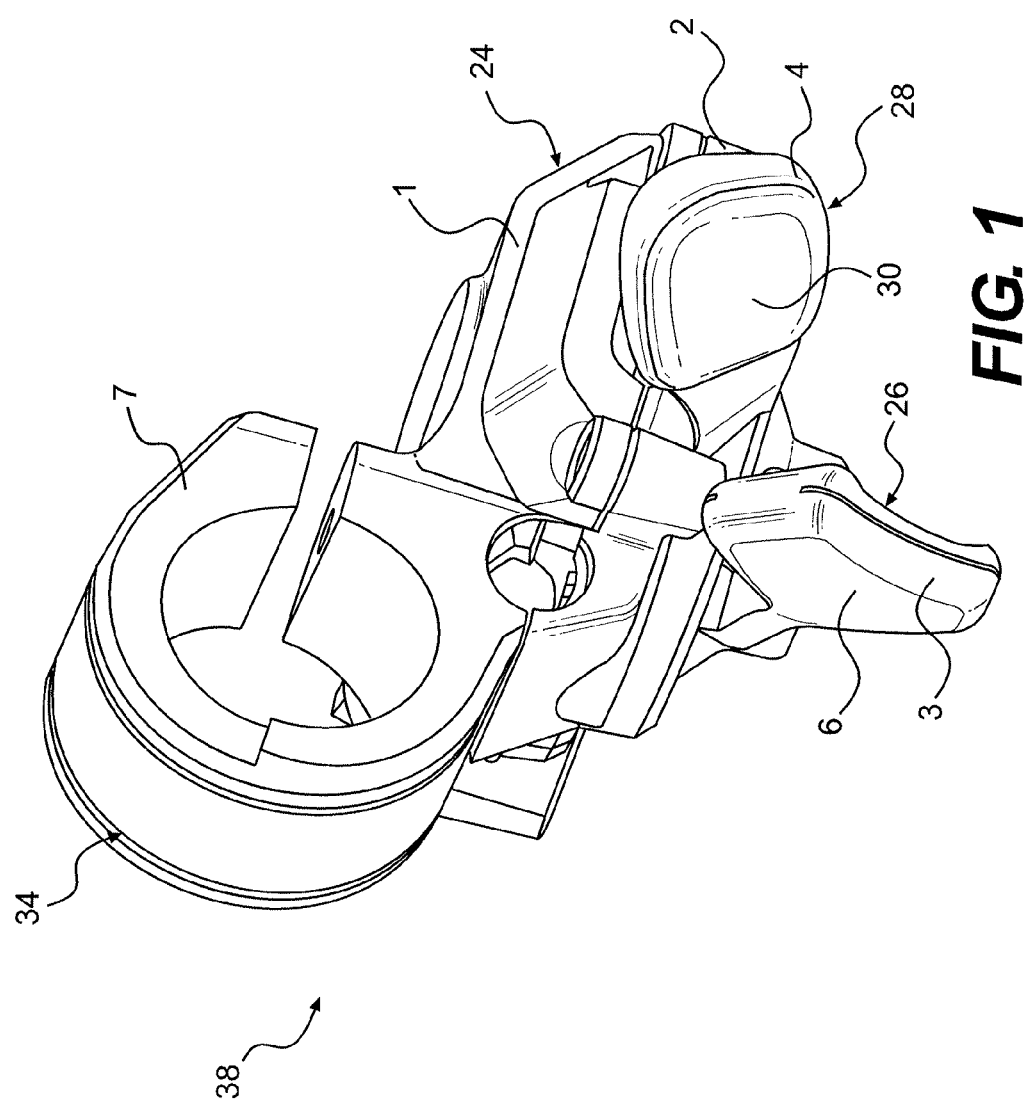
FIG. 1 is a perspective view of a bicycle trigger shifter according to one embodiment of the present invention.
Figure 2:
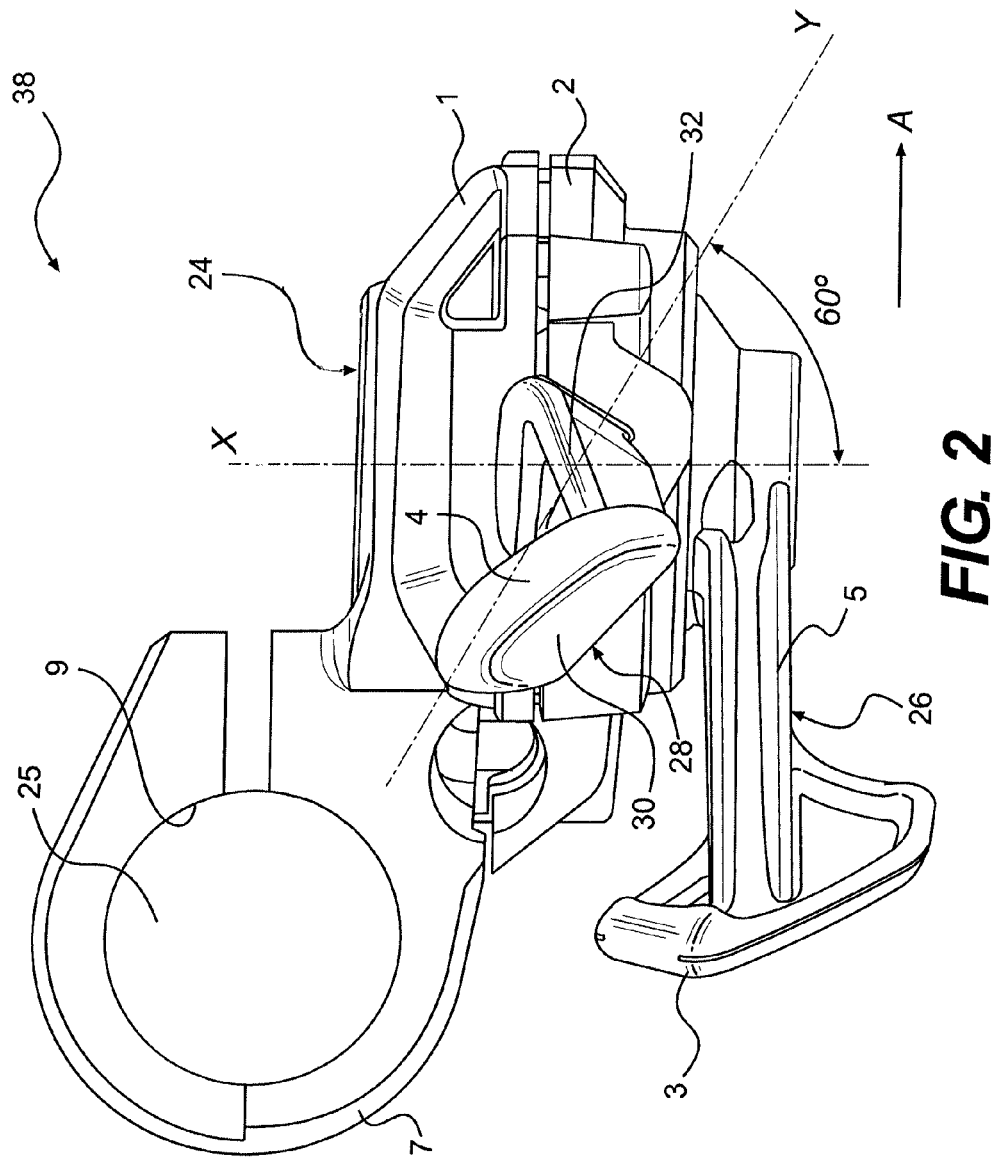
FIG. 2 is a side view of the trigger shifter of FIG. 1.
Figure 3:
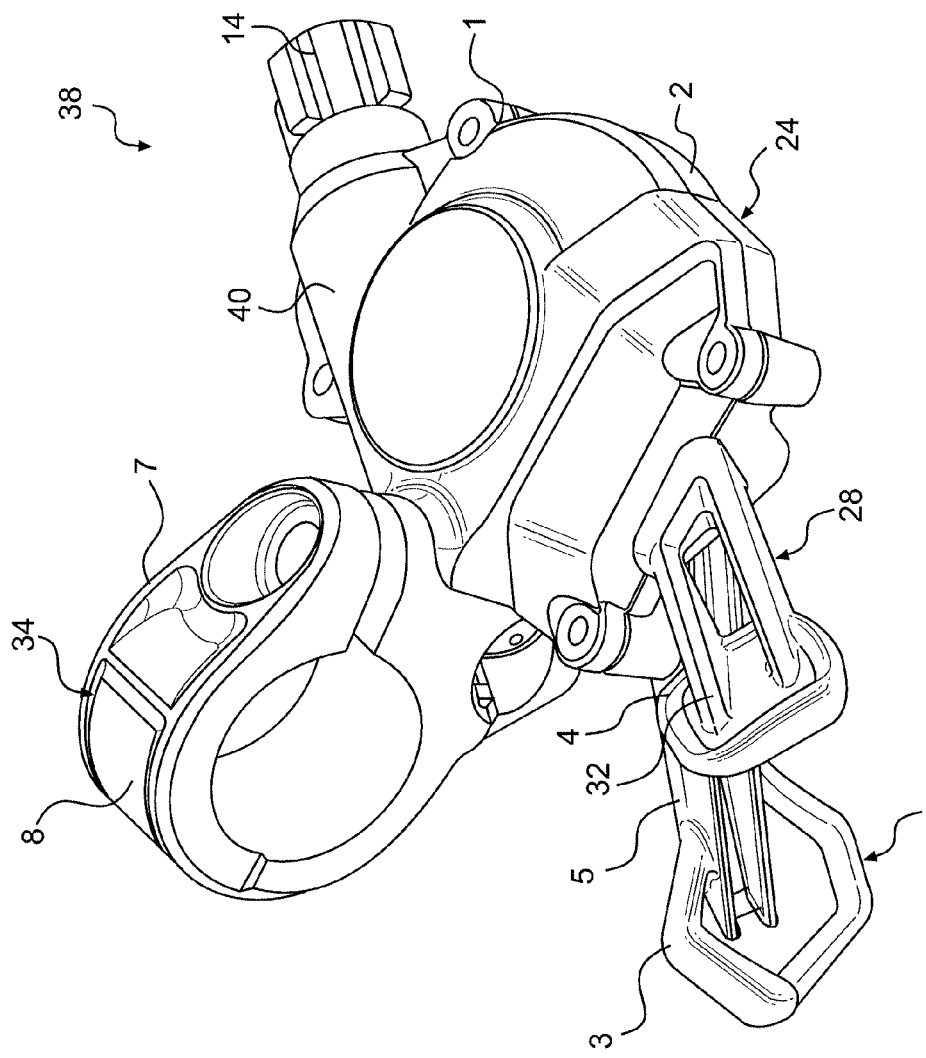
FIG. 3 is a top view of the trigger shifter of FIG. 1.

FIGS. 1-6 illustrate a bicycle trigger shifter 38 in accordance with one embodiment of the present invention. The trigger shifter 38 generally includes a housing 24, a cable spool 10, a pull lever mechanism 26, and a release lever mechanism 28. The housing 24 is mountable to a handlebar 25 of the bicycle. The housing 24 includes a clamp 7 and upper and lower shells 1, 2 that are bolted together. Alternatively, the housing 24 may be one-piece. Looking to FIG. 2, the upper shell 1 of the housing 24 includes an upper edge located below the center of a clamp opening 9 to provide space for a brake lever mechanism thereabove. A separating line between the upper shell 1 and the lower shell 2 of the housing 24 extends approximately parallel to the handlebar (FIG. 3). The clamp 7 mounts the upper shell 1 of the housing 24 to the handlebar 25. The clamp 7 and the upper shell 1 of the housing 24 form one piece. Alternatively, the clamp 7 may be formed separately from the upper shell 1 of the housing 24. The clamp 7 includes a gear display 34 having an indicator window 8 for displaying a linearly moving indicator strip that extends through the clamp 7 and engages a toothed disk 13 (FIG. 4) rotatable with the cable spool 10 to display a current gear through the indicator window 8.

Figure 4:
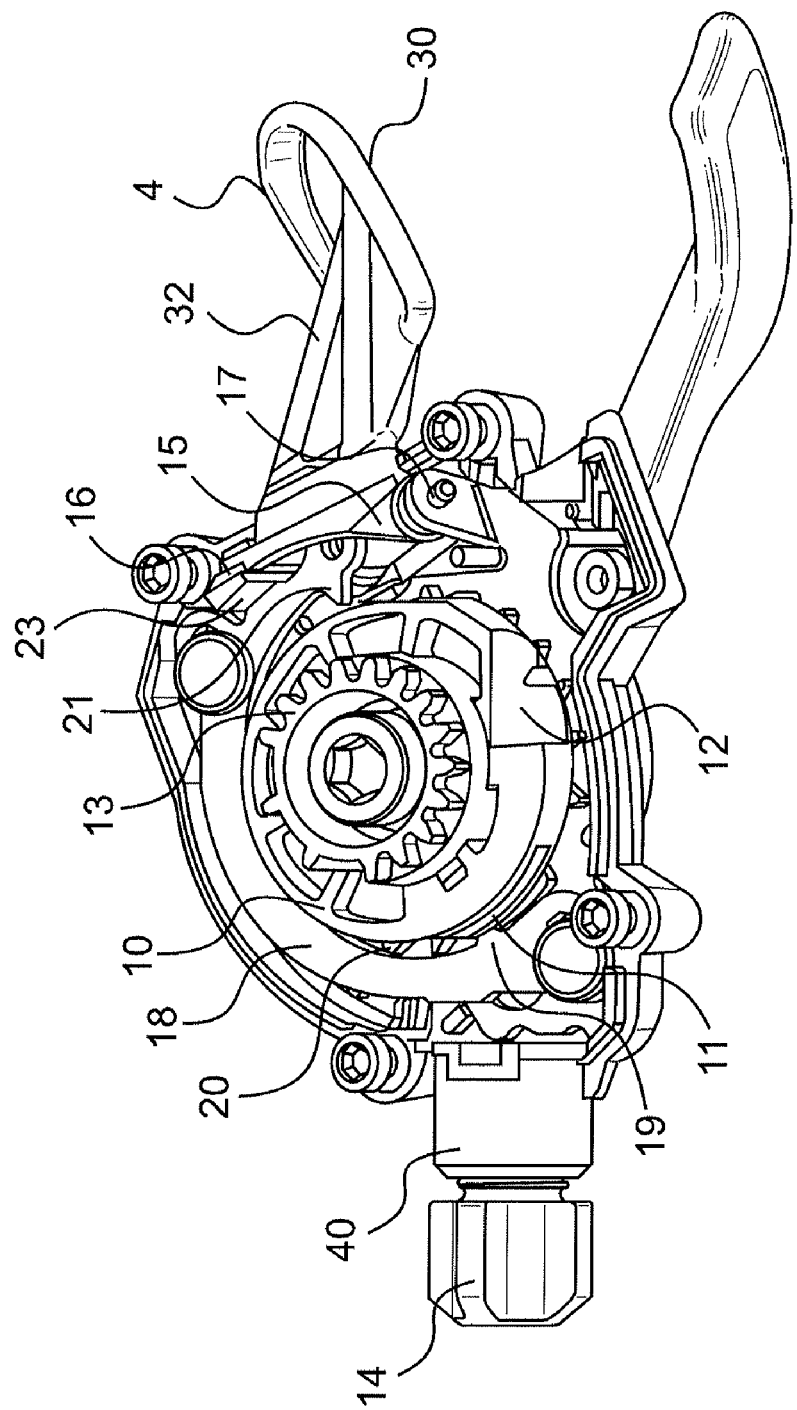
FIG. 4 is a top view of a release lever mechanism of the trigger shifter of FIG. 1.

Looking to FIG. 4, the cable spool 10 rotates about a central axis and has a cable groove 11 for receiving the control cable. The cable groove 11 has an insertion opening for securing an end of the control cable. The lower shell 2 of the housing 24 includes a cable guide 40 for guiding the control cable to the cable spool 10. An adjustment device 14 is threaded into the cable guide 40 for adjusting the length of the control cable.

Figure 5:
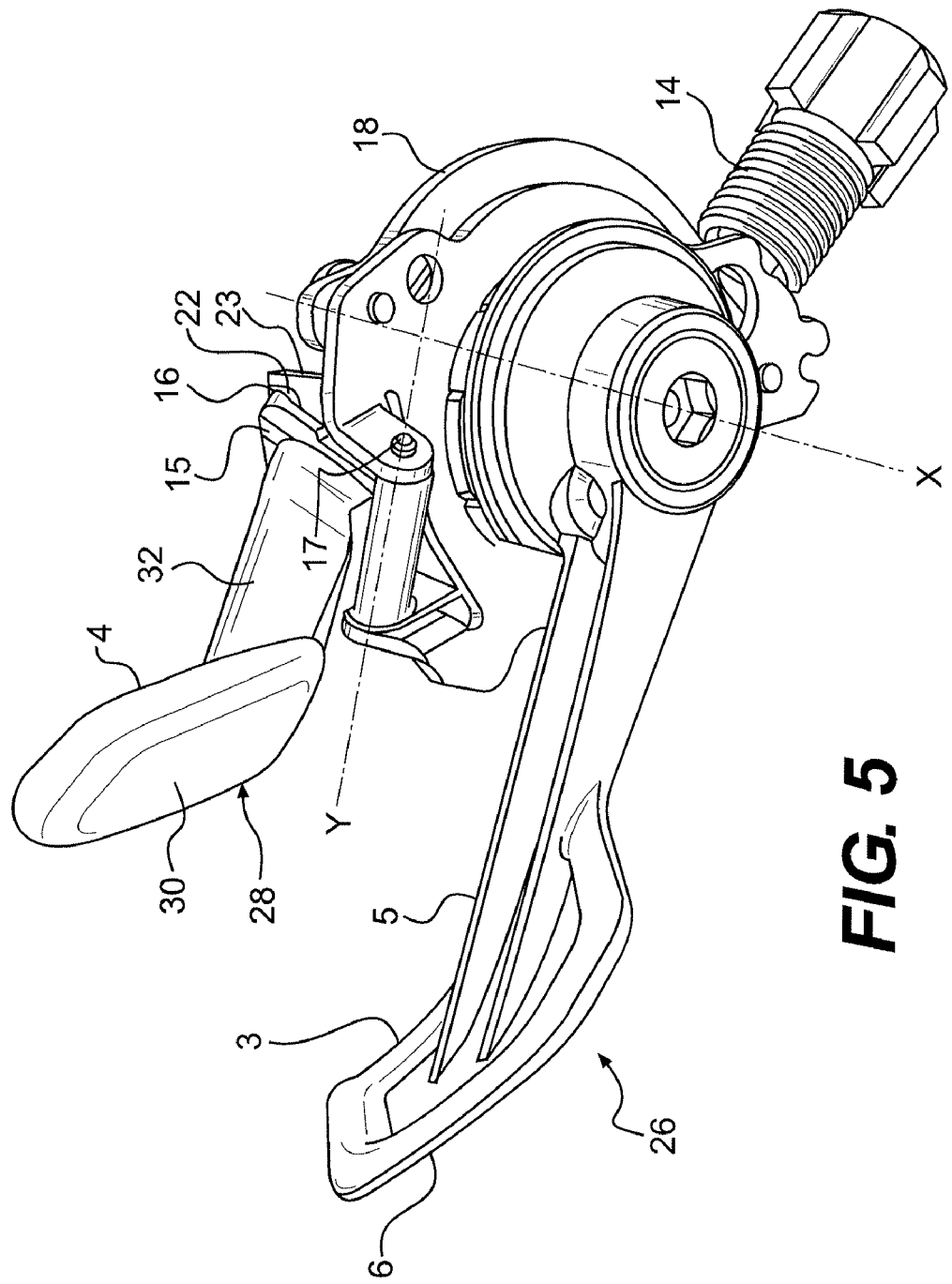
FIG. 5 is a bottom view of the trigger shifter without the housing of FIG. 1.

Looking to FIGS. 2 and 5, the pull lever mechanism 26 includes a pull lever 3 that is rotatable about a first axis X, the swept motion of the pull lever defining a first plane of motion perpendicular to the first axis X. The release lever mechanism 28 includes a release lever 4 rotatable about a second axis Y defining a second plane of motion perpendicular to the second axis Y. Preferably, the first axis X extends coaxially with the central axis of the cable spool 10 and is approximately vertical when installed. The second axis Y extends adjacent to the central axis and is tilted downward in the direction of travel such that the release lever 4 pivots simultaneously forward and upward. The first and second planes of motion form an angle therebetween in the range of 20 to 70 degrees. In a preferred embodiment, the first and second planes of motion form an angle of approximately 60 degrees.

The pull and release levers 3, 4 are disposed below the handlebar and include contact surfaces 6, 30 configured to be operated by the thumb. The release lever 4 is offset about one thumb width from the pull lever 3 in the riding direction A and is disposed above the pull lever 4. The contact surface 6 of the pull lever 3 is shaped and sized differently than the contact surface 30 of the release lever 4. The contact surface 6 of the pull lever 3 is slightly convex whereas the contact surface 30 of the release lever 4 is concave in the vertical direction and is inclined downward in a lower region of the surface 30. The incline allows the thumb to deliberately slip off the contact surface 30, resulting in a rapid shifting operation. The release lever 4 pivots about a pivot 17 approximately perpendicular to its contact surface 30 with a motion component in the forward or riding direction A, and a motion component in the upward or vertical direction. The actuation motion of the pull lever 3 is substantially in the forward or riding direction A. The contact surface 6 of the pull lever 3 is disposed approximately vertically below the center of the clamp opening 9, and the contact surface 30 of the release lever 4 is disposed in front of the handlebar.

The pull lever 3 includes a pivot arm 5. The release lever 4 includes a pivot arm 32 having a contact surface 30 and a transfer arm 15 having a drive surface 16. The pivot arm 5 of the pull lever 3 is longer than the pivot arm 32 of the release lever 4 (FIG. 3). When the release lever 4 is actuated, the transfer arm 15 pivots toward a locking element 18 having first and second locking pawls 19, 21. The transfer arm 15 displaces the locking element 18 until the first locking pawl 19 is released from a set of retaining teeth 20. The retaining teeth 20 are rotatably connected to the cable spool 10. By releasing the first locking pawl 19, the cable spool 10 rotates in the cable-release direction until the second locking pawl 21 engages the retaining teeth 20.

Figure 6:
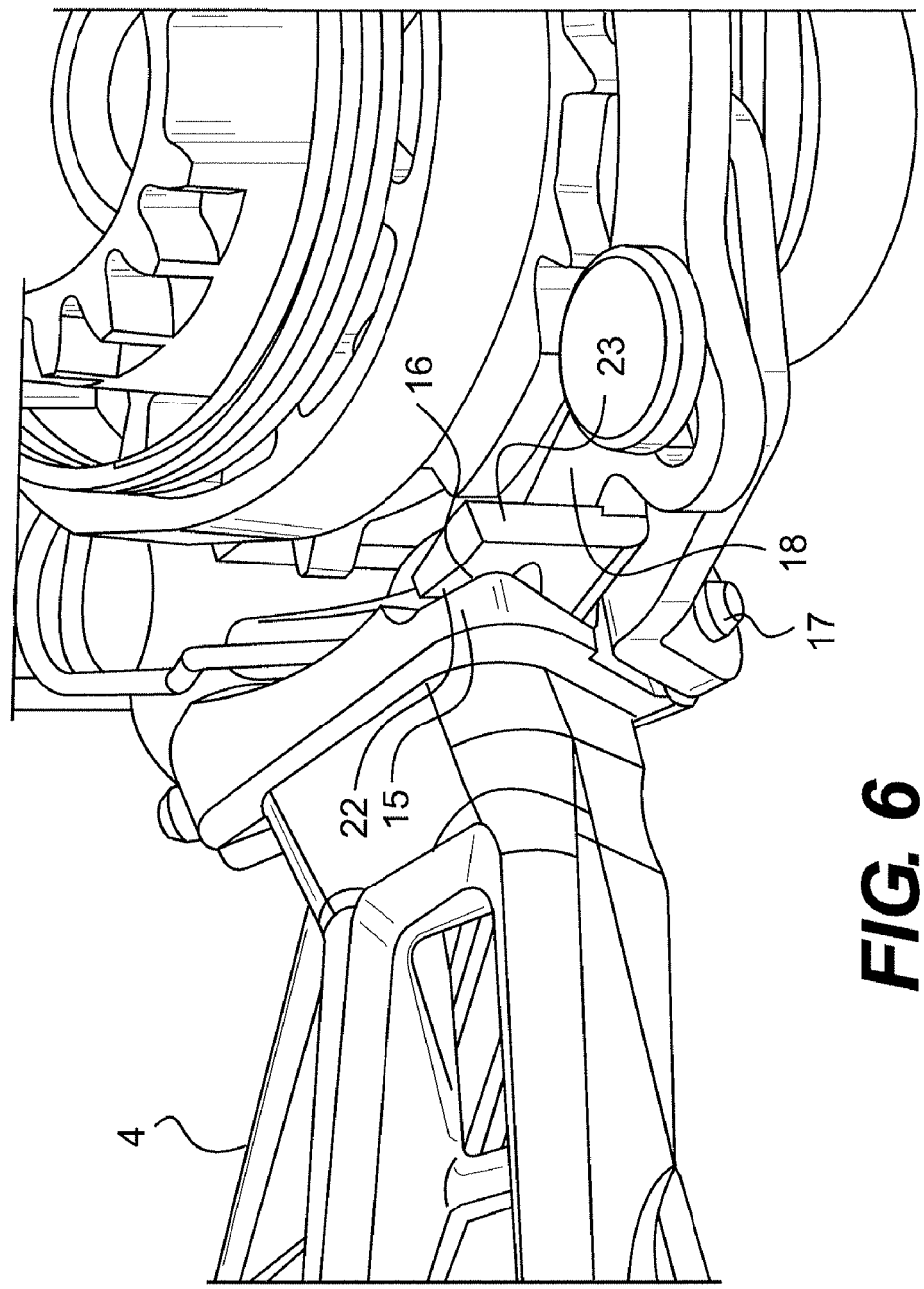
FIG. 6 is a partial view of the trigger shifter of FIG. 1 showing the interaction between a release lever and a locking element.

Looking to FIG. 6, the drive surface 16, upon actuation of the release lever 4, presses on a corresponding surface 22 of a support 23 on the locking element 18. The drive surface 16 and corresponding surface 22 matingly engage to convert the pivoting motion of the release lever 4 into a displacement of the locking element 18. To reduce friction, the drive surface 16 has a convex shape and the corresponding surface 22 is flat. The surfaces 16, 22 extends parallel in the horizontal direction to provide a linear contact between them, despite any relative motion of the surfaces 16, 22. Alternatively, the corresponding surface 22 has a convex shape and the drive surface 16 is flat.

While this invention has been described by reference to one or more preferred embodiments, it should be understood that numerous changes could be made without departing from the spirit and scope of the inventive concepts described. Accordingly, it is intended that the invention not be limited to the disclosed embodiments, but that it be afforded the full scope of protection permitted by the language of the following claims.

What is claimed is:

1. A trigger shifter for operating a bicycle gear change device, the trigger shifter comprising:

a housing configured to be mounted to a handlebar;

a cable spool for pulling and releasing a control cable connected to the bicycle gear change device;

a pull lever mechanism for rotating the cable spool in a cable-pull direction, the pull lever mechanism including a pull lever configured to rotate about a first axis (X) defining a first plane of motion perpendicular to the first axis; and a release lever mechanism for rotating the cable spool in a cable-release direction, the release lever mechanism including a release lever configured to rotate about a second axis (Y) defining a second plane of motion perpendicular to the second axis, the first and second planes of motion forming an angle therebetween in the range of 20 to 70 degrees, the second axis (Y) distinct from the first axis (X).

2. The trigger shifter as defined in claim 1, wherein the first and second planes of motion form an angle therebetween of approximately 60 degrees.

3. The trigger shifter as defined in claim 1, wherein the pull and release levers include contact surfaces configured to be operated by the thumb, the contact surfaces located at ends of the pull and release levers.

4. The trigger shifter as defined in claim 3, wherein the contact surface of the pull lever is shaped and sized differently than the contact surface of the release lever.

5. The trigger shifter as defined in claim 1 wherein the cable spool rotates about a cable spool axis, the first axis (X) coaxial with the cable spool axis, the second axis (Y) arranged adjacent to the cable spool axis.

6. The trigger shifter as defined in claim 5 wherein the pull lever and the release lever are arranged below the handlebar.

7. The trigger shifter as defined in claim 6, wherein the actuation motion of the pull lever is substantially in the riding direction and the actuation motion of the release lever has a motion component in the riding direction and a motion component in a vertical direction.

8. The trigger shifter as defined in claim 6, wherein the contact surface of the pull lever faces in a rearward direction opposite the forward riding direction and is disposed behind the release lever, the pull lever having a pivot arm, the release lever having a pivot arm, the pivot arm of the pull lever being longer than the pivot arm of the release lever.

9. The trigger shifter as defined in claim 6 wherein the contact surface of the release lever is partially inclined to allow the thumb to slide along the inclined contact surface as the thumb is moved in the riding direction.

10. The trigger shifter as defined in claim 6, wherein the release lever mechanism includes a locking element and the release lever includes a pivot arm and a transfer arm, the pivot arm actuated by the thumb, the transfer arm configured to engage the locking element, the pivot arm being larger than the transfer arm.

11. The trigger shifter as defined in claim 10 wherein the release lever having a drive surface configured to engage a corresponding surface of the locking element to convert the pivoting motion of the release lever to a linear motion of the locking element, the drive surface located on the transfer arm and having a convex contour.

12. The trigger shifter as defined in claim 1, wherein the housing includes an upper shell, a lower shell and a clamp.

13. The trigger shifter as defined in claim 12, wherein the clamp and the upper shell of the housing form one piece, the clamp includes a gear display.

14. The trigger shifter as defined in claim 12, wherein the clamp is configured to be attached to the handlebar, the clamp including a gear display including an indicator window for displaying a linearly moving pointer.

* * * * *